Figures 1, 2:
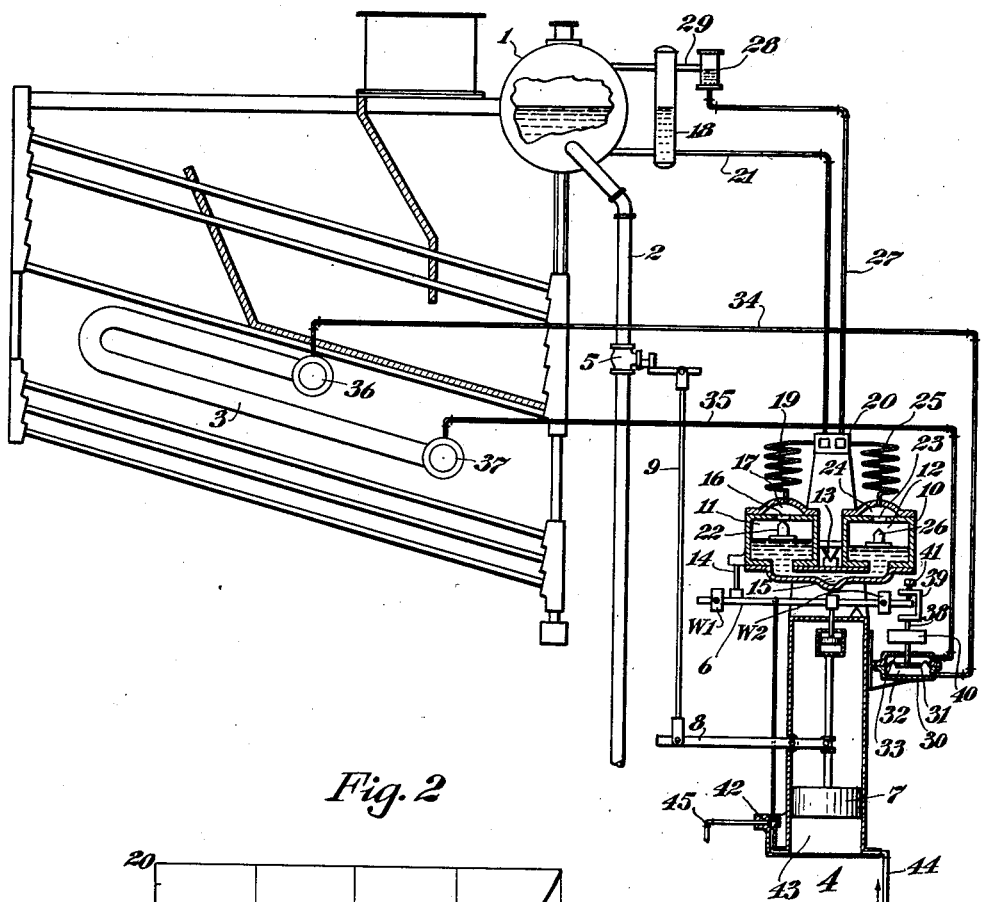

April 18, 1933.　　　C. H. SMOOT　　　1,904,554
FEED WATER REGULATOR
Filed July 24, 1929

INVENTOR
Charles H. Smoot,
BY
ATTORNEYS

Patented Apr. 18, 1933

1,904,554

UNITED STATES PATENT OFFICE

CHARLES H. SMOOT, OF MAPLEWOOD, NEW JERSEY; KATHERINE SMOOT EXECUTRIX OF SAID CHARLES H. SMOOT, DECEASED

FEED WATER REGULATOR

Application filed July 24, 1929. Serial No. 380,513.

My invention is concerned with a novel feed water regular adapted to control the supply of feed water to a boiler to maintain a predetermined water level therein for each rating of the boiler. My regulator is adapted to vary the water level with the boiler rating or to maintain the same constant as desired.

In a copending application Ser. No. 316,757, filed November 2, 1928, I have described and claimed a method of feed water regulation wherein the water level is so controlled as to increase and decrease as the boiler rating increases and decreases respectively to compensate for the formation and condensation of steam within the boiler tubes, and to maintain therefore, a more constant weight of water within the boiler. It was pointed out, in the said application, that the preferred control of the water level was such as to cause the level to approach a constant maximum for high ratings. There are numerous elements incident to the operation of a boiler plant from which forces varying with the boiler rating may be derived. The forces derived from the gas flow through the furnace, or from the steam flow, or from the stoker speed, etc. all vary approximately as the square of the boiler rating, and, if used as loading forces on a water level regulator, would cause rapidly increasing level at high ratings, where a constant maximum is desired. In the above mentioned application, I described and claimed a feed water regulator responsive to the water level and to a loading force varying with the pressure differential between the boiler drum and mud drum, which latter force insured the proper variation of the level for all ratings.

My present invention includes means whereby a loading force varying as the square of the rating may be utilized to adjust the water level regulator and yet the desired constant maximum level for high ratings be insured. These means comprise an automatic cut-off arranged to come into operation at a predetermined high rating to maintain the loading force constant at all higher ratings.

Easily obtainable, and relatively powerful forces such as a force measuring the pressure drop across the superheater are thus by my present invention made available for use in practicing the method of my pending application. My present invention includes as well a regulating apparatus of improved construction embodying various novel features, certain of which were disclosed but not claimed in my copending application.

For a better understanding of my invention, reference should be had to the accompanying drawing of which:

Fig. 1 is a view partly in section of a boiler equipped with a feed water regulator constructed according to my invention, and Fig. 2 is a graph illustrating the operation of my regulator.

In Fig. 1, numeral 1 indicates the steam and water drum of the boiler whose feed water is to be regulated. A pipe 2 leading into the water space of the drum 1 supplies feed water to the boiler and steam generated in the boiler passes through suitable piping (not shown) to a superheater coil 3 from which the steam is delivered to the headers of the plant. My novel regulator is shown at 4 arranged to control a valve 5 in the feed pipe 2 in response to a loading force varying with the boiler rating. In the embodiment illustrated, this loading force applied to the regulator is the pressure differential across the superheater coil 3. Regulator 4 comprises a pivoted balance lever 6 adapted to be acted upon by the controlling forces, as hereinafter pointed out, and a piston 7 adapted upon vertical displacement to adjust the valve 5 by means of an arm 8 pivotally mounted on a fixed part of the regulator and linked at one end to the piston rod of piston 7 and at the other end to a rod 9 arranged to operate the valve. Preferably the pivot for lever 6 is arranged for horizontal adjustment. A casing 10 comprising two interconnected chambers 11 and 12 is pivotally mounted at 13 on a fixed part of the regulator, and is connected to one end of lever 6 by means of a link 14.

Chambers 11 and 12 are partially filled with mercury or other suitable heavy fluid, to a level substantially above the passage 15 connecting the chambers. The upper wall of chamber 11 is provided with an opening 16 leading into a smaller chamber 17, which chamber is in communication with the water space of the boiler gauge glass 18 by means of flexible steel piping 19, valve block 20 mounted on the regulator and pipe 21 leading therefrom to the lower end of the gauge glass. A safety valve 22 floats upon the surface of the mercury in chamber 11 and serves to close opening 16 upon excessive increase of mercury level to prevent passage of mercury into chamber 17 and hence into the steel tubing 21. Similarly the upper wall of chamber 12 is provided with an opening 23 leading into a chamber 24 from which a flexible steel piping 25 leads to another port in valve block 20 and a safety float valve 26 serves to close opening 23 upon excessive increase in mercury level in chamber 12. Piping 25 communicates through valve block 20 with a pipe 27 leading to the lower end of a chamber 28, the interior of which is in communication with the steam space of the gauge 18 by means of a short pipe 29. In operation the space above the mercury in chamber 11 and the connections leading thereto from the gauge glass 18 are filled with water. The pressure acting upon the mercury in chamber 11 thus varies with the level of the water in the drum and with the steam pressure acting upon the surface of the water in the drum. Steam from the drum 1 and gauge 18 passes into chamber 28 and there condenses so that this chamber up to the level of pipe 29, chamber 12 above the surface of the mercury and the piping intermediate these chambers are likewise filled with water during operation. The pressure upon the mercury in chamber 12 thus varies directly with the steam pressure in drum 1; the pressure due to the height of the condensed water column being constant as determined by the pipe connection 29. The pressure differential between chambers 11 and 12 thus varies solely with the water level in the boiler; decreasing as the water level increases. Casing 10 will thus tend to be rocked in one direction or the other about its pivot 13 upon variation in water level; an increase in water level causing a flow of mercury through passage 15 from chamber 11 to chamber 12 to tend to rock casing 10 in a clockwise direction and a decrease in water level causing a flow of mercury in the opposite direction to tend to rock casing 11 in a counter-clockwise direction. The pressure in chamber 11 is always less than that in chamber 12, with the result that the mercury in chamber 11 is always higher than that in chamber 12, wherefore casing 10 transmits through link 14 to lever 6 a downward force the magnitude of which varies inversely with the water level.

Mounted on regulator 4 and externally thereto is a casing 30 divided by a diaphragm 31 into two chambers 32 and 33 in communication by means of pipes 34 and 35 with the entrance 36 and exit 37 respectively of the superheater 3. Diaphragm 31 has rigidly attached thereto a rod 38 which passes through a bushing in the upper wall of casing 30 and which carries at its upper end a yoke member 39. Rod 38 likewise carries a weight 40 the magnitude of which is chosen with relation to the rating at which constant maximum water level is desired as hereinafter pointed out. Lever 6 extends between the arms of member 39 and is in contact with the upper arm thereof by means of an adjustable screw 41 which thus transmits to the lever so long as the two are in communication a downward force varying inversely with the differential pressure across the superheater 3. When the upward force due to pressure differential across the superheater exceeds the downward force of weight 40, yoke 39 is lifted out of engagement with lever 6, whereby further increase in steam flow is ineffectual to actuate lever 6. Adjustable weights $W_1$ and $W_2$ are provided on lever 6, one on either side of the pivot, for initial adjustment of the regulator.

Movement of lever 6 upon variation in water level or steam flow through the superheater is arranged in any suitable manner to cause a related movement of piston 7 to operate valve 5. In the particular modification illustrated movement of lever 6 varies the position of a throttle valve 42 carried thereby to vary the pressure of an auxiliary fluid such as oil in a chamber 43 beneath piston 7, and to thereby cause vertical movement of the piston in one direction or another. The auxiliary fluid is supplied from any suitable source through a pipe 44 and enters through a restricted orifice into chamber 43, from where it passes into a pipe 45 connected beyond the port controlled by valve 42.

In Fig. 2 I have indicated graphically various relationships between rating and water level which may be obtained by means of proper adjustment of the device of Fig. 1. Curves A and B illustrate the variation in water level with rating when no cut-off is provided below 400% rating.

As shown the total water level variation for curve A is greater than that for curve B. This difference is a function of the position of the pivot of lever 6; curve A corresponding to a position of the pivot closer to link 14 than does curve B. Curve C illustrates a relative variation of water level with rating of about the same magnitude as curve B, but starting with a level of five inches at zero rating and remaining constant above 200% rating at 10 inches. The position of weights $W_1$ and $W_2$ with respect to weight 40 determine the water level at zero rating; movement of weight $W_1$ to a position further from the pivot or movement of weight $W_2$ nearer the pivot, increasing the water level for zero rating. The dotted portion of curve C illustrates the apparatus adjusted for a cut-off at 260% rating by increasing the magnitude of weight 40. Curve D illustrates the operation of the apparatus when adjusted by the position of the pivot for a large water level variation and with a cut-off at 300% rating by reduction in the magnitude of weight 40.

In operation when at any particular rating the water level is that for which the regulator has been adjusted the moments about the pivot of lever 6 are equal; the forces due to casing 10 and to weight $W_1$ just balancing the forces due to the pressure drop across the superheater and weight $W_2$. Piston 7 will therefore be stationary and valve 5 will be held in a definite position. If now the boiler rating increases, the superheater pressure drop will increase with the increased flow of steam resulting in upward force upon or movement of diaphragm 31 and consequently the downward force upon the lever 6 by member 39 and weight 40 will decrease. The increased rating will cause the formation of steam within the boiler tubes and a consequent increase in water level. The increase in water level reduces the pressure difference between chambers 11 and 12, causing mercury to flow into chamber 12 and thereby reducing the downward force exerted on lever 6 through link 14. If the above described decreases in these two controlling forces are of such magnitudes that lever 6 remains in balance, then no shift of valve 5 occurs. Gradually, however, the increased steam flow reduces the water level sufficiently to cause lever 6 to become unbalanced and to tip in a counter clockwise direction, thus partially closing throttle valve 42 and causing piston 7 to ascend to open valve 5 sufficiently to restore the water level to that desired. Conversely, with a sudden decrease in rating, the controlling force exerted upon lever 6 by member 39 increases and the controlling force exerted through link 14 increases due to collapse of steam within the tubes. If these increased forces are in balance upon lever 6, no change in the setting of valve 5 occurs, until the water level begins to rise due to the lessened steam flow. If lever 6 becomes unbalanced by the changes in the controlling forces upon a change in rating, valve 5 is shifted in such direction as to restore the proper relationship between level and rating determined by the adjustment of the weights and leverages. When the rating exceeds the value at which constant water level is desired, yoke 39 is lifted from the balance and the water level device 10 operates upon lever 6 to maintain the water level constant as established by the regulator unaffected by the weight 40 and the steam flow diaphragm.

I have now described one modification of my invention in which the pressure drop across the superheater was used to create a controlling force upon the lever throughout any desired rating. Obviously any other force varying with the boiler rating, such as the air flow through the furnace, the stoker speed, etc. could be used in place of the superheater pressure drop.

The water level responsive device of my regulator is extremely sensitive as friction is substantially eliminated in the moving parts; no packings or pressure tight bearings being necessary therewith. The provision of the cut-off device by which the force varying with the square of the rating is removed from the balance before this force reaches an unsafe value, permits of the safe employment of these powerful forces throughout a limited range of operation. While technically there is a distinction between the terms "boiler rating" and "steam flow", generally, so far as the applicant's invention is concerned, boiler rating may be considered as being measurable in terms of steam flow, though the expression "boiler rating" is preferred in this specification.

Various other substitutions or rearrangements of parts could be made without departing from the spirit of my invention and certain parts could be advantageously employed without the use of other parts.

I claim:

1. A boiler feed water regulator comprising in combination a balancing device, means for acting on said device with a force varying inversely with the water level within the boiler, means for acting on said device with a force varying inversely with the square of the boiler rating, feed water supply means, means for controlling said supply means by said device, and means for removing said last mentioned force from said balance when the boiler rating exceeds a predetermined value.

2. A feed water regulator for a boiler furnace provided with feed water supplying means comprising in combination a balancing device, means for acting upon said device with a force responsive to the water level within the boiler, means for acting upon said device with a force responsive to a function of the boiler rating, means for removing said last mentioned force from said balance when the boiler rating exceeds a predetermined value, and means for controlling said supplying means by said device.

3. In a feed water regulator for boiler furnaces, a water level responsive device comprising a casing divided into two chambers interconnected at their lower end and adapted to contain mercury above the interconnected portion, a pivoted support for said casing intermediate said chambers, connections including flexible piping from the upper portion of one of said chambers to the water space of the boiler drum and from the upper portion of the other of said chambers to the steam space of the boiler drum, a balancing device linked to one end of said casing, and means controlled by said device for adjusting the supply of feed water to the boiler.

4. The combination according to claim 3 including valves floating upon the surface of the mercury within said chambers adapted upon excessive increase in the mercury level to prevent passage thereof into said connections.

5. In a regulating apparatus a pivoted balance lever, a cut-off device comprising a casing mounted on a fixed part of the apparatus and divided into upper and lower chambers by a diaphragm, a weighted rod rigidly mounted on said diaphragm adapted to extend through and be slidable in the upper wall of said casing, pressure connections to each of said chambers, and a member carried by said rod adapted to contact with and bear down on one end of said lever when the excess of pressure in the lower chamber over that of the upper chamber is less than the weight of said rod and member and to be out of contact therewith when said excess pressure exceeds the weight of said rod and member.

6. In a regulating apparatus of the type wherein a force varying as a function of the element controlled opposes controlling forces upon a balance and the balance upon departure from neutral adjusts the element, pressure responsive means associated with said balance, a weighted member rigidly attached to said means, adapted under certain conditions to engage and transmit to said balance one of said controlling forces and under other conditions to be out of engagement with said balance, said conditions depending upon the weight of said weighted member relative to the pressures to which said means responds.

7. A feed water regulator for a boiler provided with a superheater, comprising water level responsive means adapted to control the supply of feed water to maintain a constant water level, means responsive to the pressure differential across the superheater and adapted to modify the action of said first mentioned means whereby the water level is made to increase with increasing steam flow through the superheater and to decrease with decreasing steam flow, and means associated with said last mentioned means for making the same inoperative to modify the water level when the steam flow exceeds a predetermined value whereby a constant maximum water level is maintained at high ratings.

In testimony whereof, I have signed my name to this specification.

CHARLES H. SMOOT.